Aug. 24, 1943.         A. W. McCLARY         2,327,731
METHOD OF FABRICATING METAL DRUMS
Filed June 24, 1940
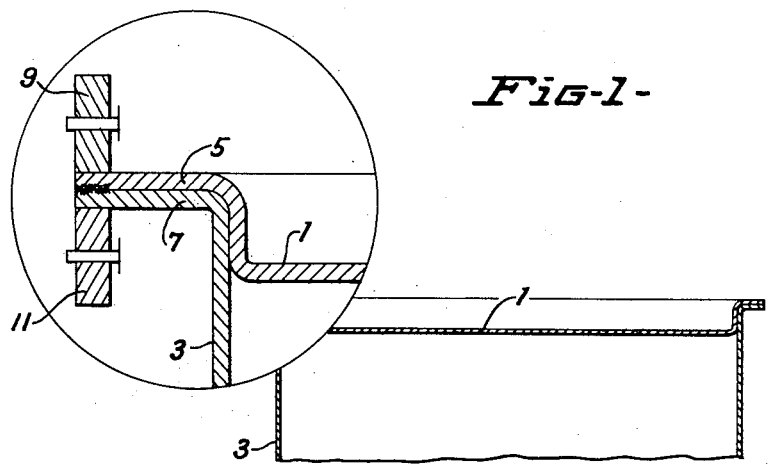
Fig-1-
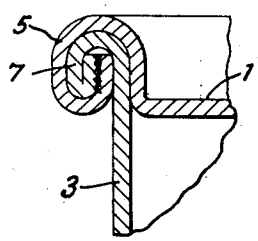
Fig-2-
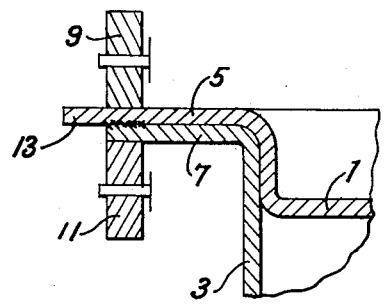
Fig-3-
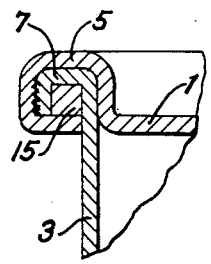
Fig-5-
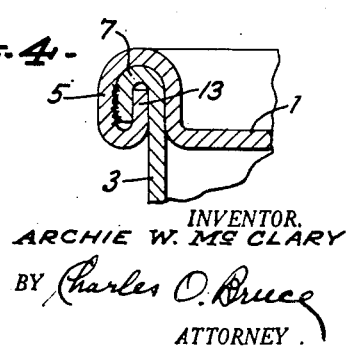
Fig-4-
INVENTOR.
ARCHIE W. McCLARY
BY Charles O. Bruce
ATTORNEY.

Patented Aug. 24, 1943

2,327,731

UNITED STATES PATENT OFFICE 2,327,731

METHOD OF FABRICATING METAL DRUMS

Archie W. McClary, Oakland, Calif.

Application June 24, 1940, Serial No. 342,051

1 Claim. (Cl. 113—120)

My invention relates to metal drums and barrels, and more particularly to the manner of sealing the head sheet to the wall sheet of such drums and barrels and to the seam resulting therefrom.

In accordance with prevailing present day practice, metal drums and barrels are generally fabricated by flanging the wall and head sheets in a direction substantially normal to the wall sheet, and then crimping or folding these flanges into a bead or seam against the wall sheet. During this crimping or folding operation, cement is placed into the folds and compressed tightly therein to seal the drum head against leakage of liquid contents that may subsequently be placed in the barrel or drum. To maintain the sealing effect of the cement in this type of seam, it is essential that the material from which the drums and barrels are fabricated, shall be of sufficiently heavy gauge to preclude springing or other deformation of the seam material during normal use. The gauge necessary for this purpose is heavier than that which would ordinarily be required to withstand the stresses which the walls of the drum or barrel meet in use.

The cement sealed seam, while it can thus be made leak-proof as against liquids, is not inherently a vapor-proof type of seam, and in as much as metal drums and barrels are widely employed in the shipping and handling of highly vaporous liquids, such as gasoline, it naturally follows that this type of drum offers disadvantages from this angle. The cement sealed type of seam, furthermore, is very readily opened up or sprung when the drum or barrel is subjected to rough handling. Thus, while it may have originally been leak-proof as against liquids, it is quite apt to lose this characteristic under such conditions of handling.

Quite often also, drums and barrels fabricated from sheet metal are damaged to the extent that the metal wall or the head sheet becomes cracked or punctured. Such damage usually occurs in the neighborhood of the bung opening which is normally located close to the seam. The cement sealed type of seam does not readily allow for repair of such cracks or punctures, since such repairs are best accomplished by welding, and the application of welding heat to the drum in the vicinity of a seam of this character will burn out the cement in the region of the welding operation, thereby causing the drum to leak. It is then necessary to effect a resealing of the seam, following the repair of such crack or puncture, and to accomplish a satisfactory job, it is essential to weld along the complete seam, which in itself is a rather costly procedure. Any attempt to economize by confining the welding of the seam to the region where the cement has been burned out, will only result in the burning out of the cement further along the seam.

Among the objects of my invention are to provide a method of fabricating an improved metal drum or barrel—

(1) Which shall permit of a lighter gauge material in the fabrication thereof than is necessary in the manufacture of similar containers in which sealing is effected by a cement seal.

(2) Which shall embody a seam having the ability to withstand stresses and strains to a considerably higher degree than that of the cement sealed type, in spite of the use of a lighter gauge material in the fabrication of the drum or barrel, (3) Which shall embody a seam that is not only leak-proof as against liquids, but is also vapor-proof and will remain vapor-proof, (4) Which shall embody a seam that will withstand the heat of welding and thereby permit repair of cracks and punctures in the neighborhood of the seam, by a welding operation, and (5) Which shall be more economical to manufacture, and of lighter weight than present drums intended for the same field of use.

Additional objects of my invention will be brought out in the following description of the same taken in conjunction with the accompanying drawing wherein—

Figure 1 is a fragmentary view, in section, partly magnified, of one embodiment of my invention, depicting my improved drum or barrel in an intermediate stage of its manufacture.

Figure 2 is a view, in section, of the magnified portion of Figure 1, illustrating my improved drum or barrel as completed.

Figures 3 and 4 are views corresponding to Figures 1 and 2, of a second embodiment of my invention.

Figure 5 is a view illustrating a further embodiment of my invention, wherein I include a reinforcing ring in the formation of the seam which unites the head sheet to the wall sheet of the drum.

In fabricating a drum in accordance with my invention, I avoid the use of any cement as a means for securing a leak-proof seam, and in thus avoiding the necessity of relying upon an agency of this character, I necessarily eliminate the weaknesses and other disadvantages which can be traced to the use of such material in a drum seam.

I obtain my improved results by first welding thet rim of the head sheet to the adjacent rim of the wall sheet, and crimp or fold the welded rims into a bead or the like, while the metal along the weld is still hot and flowable. The flowable character of the welded material not only facilitates the crimping or folding of the rims, but also permits any necessary relative shifting movement between those portions of the adjacent rims which have not been welded.

It will necessarily follow that, because the adjacent rims of the head and wall sheets are welded together, the resulting seam will not only be leakproof as against liquid contents in such drum, but will inherently also be leak-proof as against any vapors which may be given off by such liquid contents, and this will be independent of the gauge of material employed in the manufacture of the drum.

In as much as my improved seam no longer has to rely upon a heavy gauge sheet material to retain its sealing ability, the thickness of the sheet material from which the drum is to be fabricated need no longer be governed by this factor, but may be made dependent upon the stresses which the head sheet and wall sheet of the drum are to encounter during normal use. Since such stresses will not require as heavy a gauge as was previously called for in prior constructions utilizing the cement sealed seam, my invention will accordingly permit of the manufacture of drums of a much lighter gauge material. This not only reduces the initial cost of the drum, but also results in material savings in freight charges.

My improved type of seam will naturally withstand any application of heat adjacent thereto and, consequently, welding may be resorted to as a convenient means for repairing any cracks or punctures occurring in the drum during use.

For a more detailed description of my invention, reference will now be made to the drawing, wherein my improved seam and method of forming the same is illustrated in connection with that type of drum, wherein the head sheet is dished and inserted within the open end of the wall sheet to provide a recessed drum head. In accordance with the embodiment of Figures 1 and 2, the head sheet 1 and wall sheet 3 are flanged normal to the wall sheet, with the rim portions 5 and 7, respectively, of the flanges in matching engagement and coextensive. These rims are peripherally welded together, either along their adjacent ends or their edges, or at any permissible distance therefrom, along substantially a narrow path.

Any means for so welding the rims together may be resorted to, but one method which is particularly adapted for this operation is the electrical resistance welding method, wherein a pair of rollers 9 and 11 bearing against the matched rims 5 and 7 from opposite sides, are connected to a source of electric power (not shown) and are caused to travel relatively with respect to the rims, and traverse a circular path along the portions thereof to be welded. Immediately upon completion of the welding operation, the rims are placed between available crimping rolls, and crimped to form the finished seam. Preferably, the crimping follows progressively behind the welding. In as much as the welded material is still at high temperature from the welding operation at the time of crimping, the same is readily flowable under pressure, and, consequently, this condition of the metal greatly facilitates the crimping of the rims and permits any necessary relative movement between the unwelded portions during the crimping operation. The welding is preferably done along the edges of the rims or the ends thereof, whereby the welded portion may be tucked in during the crimping operation and thereby hidden from view in the finished article.

In the modification illustrated in Figures 3 and 4, the flange 5 of the head sheet is made larger than that of the wall sheet, so as to cause the rim of the head sheet to extend beyond that of the wall sheet and provide an overhang 13. This will permit the overhang to be tucked in adjacent the wall sheet 3, between said wall sheet and the welded portion, during the crimping operation which follows the welding of the two flanges as in the previous embodiment.

As a further embodiment of my invention and one which will permit reinforcement of the seam when a reinforced seam is desired, I provide a reinforcing ring 15 about the wall sheet 3 adjacent its flange 7, and following the welding of the head sheet rim to that of the wall sheet rim, I crimp the welded flanges about the reinforcing ring. I have shown such reinforcing ring incorporated in a seam wherein the head sheet flange included an overhang 13 as in Fig. 3. In such case, the overhang will be folded under and against the underside of the reinforcing ring and serves to retain it in position hidden from view. A similar reinforcing ring may in like manner be incorporated in the seam structure of Figure 1.

From the above description of my invention, it will be apparent that it fulfills all the objects of my invention as previously set forth. While I have disclosed my invention in detail, the same might be modified or altered to provide additional modifications, without departing from the spirit thereof, and I accordingly do not desire to be limited in my protection to the specific embodiments disclosed, except as may be necessitated by the prior art and the appended claim.

I claim:

The method of fabricating a container of sheet metal material, comprising telescoping a cylindrical head sheet into a cylindrical wall sheet, with rim portions of each in substantial contact throughout the extent of said rim portions, welding said rim portions along a substantially continuous path around said rim portions and in so doing, heating said path material to a temperature rendering the material along said path readily flowable under pressure, and folding said rim portions during such condition of said path material to an angle of the order of 90° or more to permit any necessary relative movement between unwelded sections of said rim portions during folding.

ARCHIE W. McCLARY.